United States Patent Office 3,544,327
Patented Dec. 1, 1970

3,544,327
POLYMERIC FOG STABILIZERS FOR PHOTOGRAPHIC EMULSIONS
Edward P. Abel and Louis M. Minsk, Rochester, N.Y., assignors to Eastman Kodak Company, Rochester, N.Y., a corporation of New Jersey
No Drawing. Filed Mar. 3, 1967, Ser. No. 620,272
Int. Cl. G03c 1/34
U.S. Cl. 96—109                                    15 Claims

ABSTRACT OF THE DISCLOSURE

A photographic silver halide emulsion or photographic element containing a fog-stabilizing amount of an ammonium or alkali metal salt of a copolymer of maleamic acid with an α-ethylenically unsaturated compound.

BACKGROUND OF THE INVENTION

Field of the invention

This invention relates to new and improved antifoggants and stabilizers for photographic elements and to photographic silver halide emulsions containing said antifoggants and stabilizers therein.

Description of the prior art

During development of a silver halide emulsion, small amounts of silver halide are reduced to metallic silver regardless of whether or not they have been exposed. This reduction of silver ion produces a background fog which is more specifically referred to as chemical fog.

Chemical fog, apparent in most silver halide systems, has been reduced by prior art methods of processing exposed silver halide material in the presence of compounds which restrict development of unexposed silver halide. Such compounds can be incorporated in the silver halide emulsion or in the processing solutions for developing such silver halide emulsions. Compounds which have been found to have a chemical fog inhibiting effect on emulsions which have been subjected to high temperature and high humidity conditions are referred to as emulsion stabilizers. On the other hand, compounds which have been found to have chemical fog inhibiting effects on emulsions which have not been exposed to adverse storage conditions are referred to as antifoggants. Although a large number of emulsion stabilizers and antifoggants have been used in the prior art, many of these compounds cause undesirable losses in emulsion speed and contrast and others lack adequate compatibility with emulsion gelatin.

SUMMARY OF THE INVENTION

According to this invention, there is incorporated into the silver halide emulsion of a photographic element or in a layer contiguous to the silver halide emulsion, a fog-stabilizing amount of an ammonium salt or alkali metal salt or mixture thereof of a copolymer of maleamic acid with an α-ethylenically unsaturated monomer. The copolymer salts stabilize the emulsion against fog when the dried emulsion has been subjected to a prolonged high humidity and temperature incubation period without adversely affecting other sensitometric properties.

DESCRIPTION OF THE PREFERRED EMBODIMENTS

The ammonium and alkali metal salts of copolymers of maleamic acid with an α-ethylenically unsaturated compound may be prepared by techniques known in the art and many of them are commercially available. For example, the ammonium salt of copoly-(ethylene-maleamic acid) is a commercial product available from Monsanto Chemical Company under the designation DX843-23 resin. The sodium salt thereof may be prepared by the complete removal of the ammonium ion by means of ion exchange resins, acidification or controlled dialysis, and replacement with sodium ions. Mixed salts may be prepared by the controlled removal of part of the ammonium ions from an aqueous solution of the ammonium salt of the interpolymer and replacement with alkali metal ions; or by complete removal of the ammonium ions and subsequent replacement with ammonium and alkali metal ions in the desired proportions.

When the copolymer salts used in the practice of this invention are not commercially available, they may be readily prepared by known techniques. For example, a copolymer of maleic anhydride and an α-ethylenically unsaturated monomer (i.e., one which contains the group $>C=CH_2$), said copolymer having an inherent viscosity of from about 0.1 to about 1, may be reacted with ammonia or ammonium hydroxide to convert the maleic anhydride groups in the interpolymer to maleic acid monoamide (i.e., maleamic acid) groups as the ammonium salt. The desired salt may then be prepared by treating the copolymer as described in the foregoing paragraphs and in the examples set forth hereinafter.

Examples of α-ethylenically unsaturated monomers which can be used to prepare copolymers thereof with maleamic acid include α-olefins such as ethylene; vinyl alkyl ethers such as vinyl methyl ether, vinyl n-butyl ether, etc.; and vinyl esters such as vinyl acetate. Preferably, the α-ethylenically unsaturated monomer units and maleamic acid units are present as alternating segments in the copolymer in about a 1:1 mol ratio.

The copolymer salts may be incorporated into the silver halide emulsion of a photographic element or in a layer contiguous to the silver halide emulsion in a fog-stabilizing amount. They may be used in any amount which will stabilize the silver halide emulsion against fog. In general, a concentration of the copolymer salt in an amount of about 5 grams to about 50 grams per mole of silver in the silver halide emulsion is useful.

The preparation of photographic silver halide emulsions such as are suitably stabilized with the addenda of this invention typically involves three separate operations: (1) emulsification and digestion of silver halide, (2) the freeing of the emulsion of excess water-soluble salts, suitably by washing with water, and (3) the second digestion or "after-ripening" to obtain increased emulsion speed or sensitivity. (Mees, "The Theory of the Photographic Process," 1954.) The stabilizers of this invention can be added to the emulsion before the final digestion or after-ripening, or they can be added immediately prior to coating. Effective fog-stabilization is achieved only when the water-soluble compounds of the invention are incorporated after the silver halide emulsion has been washed. In general, where the antifoggant is added before washing, the amount of copolymer salt remaining in the emulsion following such washing does not afford stabilization.

The invention can be further illustrated by the following examples or preferred embodiments thereof; although it will be understood that these examples are included merely for purposes of illustration and are not intended to limit the scope of the invention.

The preparation of the fog inhibiting copolymer salts which may be used in accordance with the practice of this invention is exemplified in Examples 1 to 13.

EXAMPLE 1

Preparation of mixed sodium-ammonium salt of copoly (ethylene-maleamic acid)

This example illustrates the controlled removal of a portion of the ammonium ions from a commercially available ammonium salt of an ethylene-maleamic acid interpolymer (DX 843-23, a medium viscosity resin manufactured by Monsanto Chemical Co.) and the replacement of removed ammonium ions with sodium ions. Four hundred grams of the interpolymer ammonium salt are slowly added to 2800 ml. of stirred distilled water in a 4-liter beaker. A smooth, homogeneous dope is obtained that has a pH of 6.31 as measured on a Beckman Model G meter. A sufficient quantity of washed Amberlite IR-120 ion exchange resin (an ion exchange resin comprising polystyrenesulfonic acid manufactured by the Rohm and Haas Company) is sifted into the stirred solution to reduce the pH to 4.70. The Amberlite resin is removed by filtration and the pH is re-adjusted to 6.0 with aqueous sodium hydroxide.

EXAMPLE 2

Preparation of mixed sodium-ammonium salt of copoly (ethylene-maleamic acid)

This example illustrates the total removal of the ammonium ions from an ammonium salt of an ethylene-maleamic acid interpolymer and the controlled replacement of these ions with sodium and ammonium ions. The procedure of Example 1 is repeated up to the point where the pH of the dope has been reduced to 4.70. A portion of this dope is further treated with a sufficient quantity of Amberlite IR-120 ion exchange resin to reduce the pH to a minimum of 2.0. The Amberlite resin is removed by filtration and the dope is neutralized to a pH of 4.70 with ammonium hydroxide and further neutralized to a pH of 6.0 with aqueous sodium hydroxide.

EXAMPLE 3

Preparation of sodium salt of copoly(ethylene-maleamic acid)

One hundred and fifty grams of the ammonium salt of ethylene-maleamic acid interpolymer described in Example 1 are slowly added to 1100 ml. of stirred distilled water to obtain a smooth, homogeneous dope. This is treated with a sufficient quantity of Amberlite IR-120 ion exchange resin to reduce the pH to a minimum of 2.0. The ion exchange resin is filtered off and the dope is neutralized to a pH of 6.0 with aqueous sodium hydroxide.

EXAMPLE 4

Ammonium salt of copoly(ethylene-maleamic acid)

Thirty grams of the ammonium salt of ethylene-maleamic acid interpolymer described in Example 1 are slowly added to 270 ml. of stirred distilled water to obtain a smooth, homogeneous dope. The pH is 6.50 as measured on a Beckman Model G meter.

EXAMPLES 5 TO 7

Preparation of copoly(vinyl n-butyl ether-maleamic acid)

Step (a) Copoly(vinyl n-butyl ether-maleic anhydride).—In a 12-liter flask equipped with a stirrer and reflux condenser are placed the following:

| | Grams |
|---|---|
| Maleic anhydride | 589.5 |
| Vinyl n-butyl ether (freshly distilled) | 600.0 |
| Acetone | 3600.0 |
| Benzoyl peroxide | 1.190 |

The flask is immersed in a 65° C. constant temperature bath for 22 hours. The resulting amber-colored dope is poured into stirred petroleum ether to isolate a soft white polymer which hardens on continued washing in fresh portions of anhydrous ethyl ether. The solid is dried in an air oven at 40° C. to obtain 560 g. of product. The inherent viscosity is 0.57 when measured in a Canon-Fenske-type viscometer at a concentration of 0.25 g. of polymer made up to 100 ml. with acetone at 25° C.

Step (b) Copoly(vinyl n-butyl ether-maleamic acid)—Fifty grams of the copoly(vinyl n-butyl ether-maleic anhydride) obtained in Step (a) are added to 250 ml. of 28 percent ammonium hydroxide and tumbled for 16 hours at room temperature. The resulting dope is poured into stirred isopropyl alcohol to isolate a soft polymer which hardens on continued washing in fresh acetone. The solid is dried in an air stream and redissolved in 250 ml. of distilled water.

By the procedures described in Examples 2, 3 and 4, the following salts are prepared from the solution obtained in Step (b):

| Example | Salt of copoly(vinyl n-butyl ether-maleamic acid) |
|---|---|
| 5 | mixed sodium ammonium. |
| 6 | sodium. |
| 7 | ammonium. |

EXAMPLES 8 TO 10

Preparation of salts of copoly(vinyl acetate-maleamic acid)

Step (a) Copoly(vinyl acetate-maleic anhydride)—In a 12-liter flask equipped with a reflux condenser and stirrer are placed the following:

Vinyl acetate (distilled)—860.0 g.
Maleic anhydride—980.0 g.
Acetone—5520.0 ml.
Benzoyl peroxide—27.6 g.

This solution is refluxed overnight in a 65° C. bath. The wine-colored dope is diluted to precipitation viscosity with about 5 l. of acetone and poured into 25 gallons of distilled water, strongly agitated by a mixer. The light-pink-colored polymer is washed twice with fresh water, filtered after each wash, centrifuged, and blower dried. The yield is 1730 g. The inherent viscosity in dry acetone is 0.23 measured in a Canon-Fenske viscometer at a concentration of 0.25 g. of polymer made up to 100 ml. with acetone at 25° C.

Step (b) copoly(vinyl acetate-maleamic acid)—One hundred grams of the vinyl acetate-maleic anhydride interpolymer obtained in Step (a) are suspended in 1000 ml. of benzene. Anhydrous $NH_3$ gas is passed through the slurry for six hours. The tan slurry is collected on a Buchner funnel and washed several times on the funnel with fresh benzene. The solid is dried in a vacuum oven at room temperatue to yield 111 g. of product. The dried solid is dissolved in water and the resulting dope is used to prepare the following salts of the copolymer by the procedures described in Examples 2, 3 and 4:

| Example: | Salt of copoly(vinyl acetate-maleamic acid |
|---|---|
| 8 | sodium. |
| 9 | ammonium. |
| 10 | mixed sodium ammonium. |

EXAMPLES 11 TO 13

Preparation of salts of copoly(vinyl methyl ether-maleamic acid)

The process of Step (b), Examples 5 to 7, is repeated substituting for the copoly(vinyl n-butyl ether-maleic anhydride) a low viscosity copoly(vinyl methyl ether-maleic anhydride) (Gantrez AN-119 manufactured by General Aniline & Film Corp.). The following salts of copoly(vinyl methyl ether-maleamic acid) are prepared:

| Example: | Salt |
|---|---|
| 11 | ammonium. |
| 12 | mixed sodium ammonium. |
| 13 | sodium. |

Each of the copolymer salts prepared in Examples 1 to 13 are added to separate portions of a high speed silver bromoiodide emulsion which has been panchromatically sensitized with a cyanine dye. Each emulsion sample is coated on a cellulose acetate film support at a coverage of 460 mg. of silver and 1040 mg. of gelatin per square foot. A sample of each film coating is exposed on an intensity scale sensitometer, processed for five minutes in Kodak Developer DK-50, fixed, washed and dried. The photographic results obtained from these tests are listed in Table 1.

TABLE 1

| Copolymer salt prepared in Example— | Conc. of compound in g./mole Ag | Fresh | | | 2 week incubation at 120° F. and 50% relative humidity | | |
|---|---|---|---|---|---|---|---|
| | | Rel. speed | Gamma | Fog | Rel. speed | Gamma | Fog |
| Control | | 100 | 1.28 | 0.15 | 35.5 | 0.82 | 0.73 |
| 1 | 30.0 | 115 | 1.47 | 0.20 | 76 | 0.87 | 0.20 |
| 2 | 30.0 | 120 | 1.45 | 0.20 | 74 | 0.82 | 0.19 |
| Control | | 100 | 1.30 | 0.12 | 30 | 0.65 | 0.81 |
| 3 | 30.0 | 138 | 1.33 | 0.22 | 46 | 0.65 | 0.51 |
| 4 | 30.0 | 118 | 1.25 | 0.32 | 65 | 0.78 | 0.27 |
| Control | | 100 | 1.30 | 0.13 | 16.5 | 0.73 | 1.02 |
| 5 | 9 | 107 | 1.28 | 0.13 | 45 | 0.82 | 0.61 |
| 5 | 45 | 102 | 1.32 | 0.15 | 59 | 0.95 | 0.18 |
| 6 | 45 | 112 | 1.28 | 0.13 | 65 | 0.92 | 0.24 |
| 7 | 9 | 97 | 1.33 | 0.13 | 46 | 1.03 | 0.49 |
| 7 | 45 | 95 | 1.23 | 0.13 | 50 | 0.90 | 0.16 |
| Control | | 100 | 1.30 | 0.13 | 16.5 | .73 | 1.02 |
| 8 | 9 | 105 | 1.52 | 0.15 | 71 | 1.25 | 0.26 |
| 8 | 45 | 110 | 1.57 | 0.16 | 73 | 1.22 | 0.20 |
| 10 | 9 | 94 | 1.38 | 0.17 | 63 | 1.10 | 0.39 |
| 10 | 45 | 112 | 1.58 | 0.16 | 80 | 1.33 | 0.21 |
| Control | | 100 | 1.18 | 0.15 | 14 | 0.47 | 1.20 |
| 9 | 30 | 87 | 1.13 | 0.30 | 91 | 1.12 | 0.44 |
| 8 | 30 | 107 | 1.48 | 0.19 | 87 | 1.35 | 0.20 |
| 10 | 30 | 105 | 1.25 | 0.22 | 82 | 1.28 | 0.30 |
| Control | | 100 | 1.23 | 0.16 | 49 | 0.92 | 0.55 |
| 11 | 45 | 115 | 1.37 | 0.20 | 59 | 0.83 | 0.18 |
| 12 | 45 | 102 | 1.35 | 0.22 | 68 | 0.92 | 0.18 |
| 13 | 45 | 112 | 1.30 | 0.16 | 71 | 0.95 | 0.16 |

The results in the above table show that the compounds of this invention prevent the growth of incubation fog when incorporated in photographic emulsions without adverse sensitometric effects.

The following example illustrates the advisability of adding the copolymer salt after the silver halide emulsion has been washed.

EXAMPLE 14

The ammonium salt of copoly(ethylene-maleamic acid) described in Example 1 is added to a high speed silver bromoiodide emulsion in the amount of thirty grams per mol of silver. The emulsion is chill-set, remelted, coated on a support and tested as previously described with respect to Examples 1 to 13.

For the purpose of comparison, the above procedure is repeated except that the emulsion is noddled and washed for six hours following addition of the copolymer salt but prior to remelting and coating.

The results of tests on cellulose acetate film coated with both emulsions are set forth in Table 2. In this table, the coating designated as A is prepared from the emulsion which is not washed following incorporation of the copolymer salt; and the coating designated as B is prepared from the emulsion which is washed following incorporation of the copolymer salt.

TABLE 2

| Coating | Fog | |
|---|---|---|
| | Fresh | 1 week incubation at at 120° F. and 50% relative humidity |
| Control | 0.11 | 0.22 |
| A | 0.07 | 0.06 |
| B | 0.36 | >1.00 |

This data shows that washing the emulsion following incorporation of the copolymer salt removes the stabilizing activity.

The silver halides employed in the photographic emulsions include any of the photographic silver halides, as exemplified by silver bromide, silver iodide, silver chloride, or mixed silver halides such as silver chlorobromide, silver bromoiodide and the like. The silver halides used can be those which form latent images predominantly on the surface of the silver halide grains or those which form latent images inside the silver halide crystals such as described in U.S. Patent 2,592,250 of Davey and Knott issued Apr. 8, 1952.

Photographic emulsions containing the antifogging and stabilizing agents of the present invention can be sensitized using any of the well-known techniques in emulsion making, for example, by digesting with naturally active gelatin or various sulfur compounds and/or gold compounds. The emulsions can be sensitized with salts of noble metals of Group VIII of the Periodic Table which have an atomic weight greater than 100. The emulsions can also be sensitized with labile selenium and noble metals as disclosed in U.S. Pat. 3,297,446 of Dunn issued Jan. 10, 1967. The emulsions may also contain speed-increasing addenda such as quaternary ammonium salts, polyethylene glycols, or thioether sensitizers.

The emulsions of the invention can also contain conventional additives such as gelatin plasticizers, hardeners and coating aids. These emulsions can be used in X-ray and other non-optically sensitized emulsions, and can also be used in orthochromatic, panchromatic and infrared sensitive emulsions. The additives can be added to the emulsion before or after sensitizing dyes, if any, are used.

The emulsions can be used in photographic elements intended for color photographiy, and thus may contain color-forming couplers, or used as emulsions to be developed by solutions containing couplers or other color-generating materials, or emulsions of the mixed-packet type, as disclosed in U.S. Pat. 2,698,794 of Godowsky issued Jan. 4, 1955, or emulsions of the mixed-grain type, such as disclosed in U.S. Patent 2,592,243 of Carroll and Hanson issued Apr. 8, 1952.

The emulsions obtained in accordance with this invention can be used in diffusion transfer processes which utilize the undeveloped silver halide in non-image areas of the negative to form a positive by dissolving the undeveloped silver halide and precipitating it on a silver layer in close proximity to the original silver halide emulsion layer. Such processes are described in U.S. Patents 2,352,014 of Rott issued June 20, 1944; 2,543,181 of Land issued Feb. 27, 1951; and 3,020,155 of Yackel et al. issued Feb. 6, 1962. The emulsions can also be used in diffusion transfer color processes which utilize a diffusion transfer of an imagewise distribution of developer, coupler or dye, from a light-sensitive layer to a second layer, while the two layers are in close proximity to one another.

A wide variety of emulsion vehicles and dispersing agents for silver halide grains can be employed singly or in combination with each other, for example, gelatin, colloidal albumen, cellulose derivatives and synthetic resins, such as polyvinyl compounds. Examples of typical colloids which can be used are poly(vinyl alcohol), hydrolyzed poly(vinyl acetate), hydrolyzed cellulose ester, water-soluble ethanolamine cellulose acetate, polyacrylamide, copolymers having a combined acrylamide content of 3–60 percent, copolymers of alkyl acrylate and acrylic acid, a vinyl alcohol copolymer containing urethane carboxylic acid groups or containing cyano-acetyl groups, or polymeric material which results from polymerizing a protein or saturated acrylated protein with a monomer having a vinyl group such as disclosed in U.S. Patent 2,852,382 of Jones issued Sept. 16, 1958. Such polymeric additives can be employed as latices or hydrosols in the preparation of the photographic emulsions of our invention.

The antifogging agents of this invention can be incorporated to advantage during manufacture in silver halide emulsions representing the variations described above. Moreover, fog control in binderless silver halide films prepared by vapor deposition of silver halide on a suitable support can be achieved by coating the antifogging agents of the invention over the vapor deposited layer of silver halide.

The photographic emulsions can be coated on a wide variety of supports, preferably supports which are transparent and/or flexible. Typical supports include metals such as aluminum, paper, cellulose acetate film, polyvinyl acetate film, polystyrene film, polypropylene film and other polyolefin film, polycarbonate film, polyethylene terephthalate or other polyester film and other related materials. Supports such as paper which are partially acetylated or coated with an $\alpha$-olefin polymer, particularly a polymer of an $\alpha$-olefin containing 2–10 carbon atoms, as exemplified by polyethylene, polypropylene, ethylene-butene copolymers and the like, give good results.

Although the invention has been described in considerable detail with reference to certain embodiments thereof, it will be understood that variations and modifications can be effected without departing from the spirit and scope of the invention as described hereinabove and as defined in the appended claims.

We claim:

1. A composition comprising a photographic silver halide emulsion containing a fog-stabilizing amount of an ammonium salt, an alkali metal salt or a mixture thereof of a copolymer of maleamic acid with an $\alpha$-ethylenically unsaturated monomer.

2. The composition of claim 1 wherein said salt is present in an amount of about 5 to about 50 grams per mole of silver in said silver halide emulsion.

3. The compositions of claim 1 wherein said copolymer is copoly(ethylene-maleamic acid).

4. The composition of claim 1 wherein said copolymer is copoly(vinyl n-butyl ether-maleamic acid).

5. The composition of claim 1 wherein said copolymer is copoly(vinyl acetate-maleamic acid).

6. The composition of claim 1 wherein said copolymer is copoly(vinyl methyl ether-maleamic acid).

7. A photographic element comprising a support coated with a silver halide layer, said element containing a fog-stabilizing amount of an ammonium salt, an alkali metal salt or a mixture thereof of a copolymer of maleamic acid and an $\alpha$-ethylenically unsaturated monomer.

8. The photographic element of claim 7 wherein said layer is a silver halide emulsion.

9. The photographic element of claim 8 wherein said salt is present in an amount of about 5 to about 50 grams per mole of silver in said silver halide emulsion.

10. The photographic element of claim 8 wherein said copolymer is copoly(ethylene-maleamic acid).

11. The photographic element of claim 8 wherein said copolymer is copoly(vinyl n-butyl ether-maleamic acid).

12. The photographic element of claim 8 wherein said copolymer is copoly(vinyl acetate-maleamic acid).

13. The photographic element of claim 8 wherein said copolymer is copoly(vinyl methyl ether-maleamic acid).

14. The photographic element of claim 8 wherein said salt is present in said silver halide emulsion.

15. The photographic element of claim 8 wherein said salt is present in a layer contiguous to said silver halide emulsion.

References Cited

UNITED STATES PATENTS

| | | | |
|---|---|---|---|
| 2,276,323 | 3/1942 | Lowe | 96—114 |
| 2,772,165 | 11/1956 | Moede | 96—114 |

NORMAN G. TORCHIN, Primary Examiner

R. E. FICHTER, Assistant Examiner

U.S. Cl. X.R.

96—114

PO-1050
(5/69)

UNITED STATES PATENT OFFICE
CERTIFICATE OF CORRECTION

Patent No. 3,544,327      Dated December 1, 1970

Inventor(s)    Edward P. Abel and Louis M. Minsk

It is certified that error appears in the above-identified patent and that said Letters Patent are hereby corrected as shown below:

In Column 4, line 50 (page 8, line 3 of the application), "sodium" should read ---ammonium---.

In Column 4, line 51 (page 8, line 4 of the application), "ammonium" should read ---sodium---.

Signed and sealed this 18th day of May 1971.

(SEAL)
Attest:

EDWARD M. FLETCHER, JR.      WILLIAM E. SCHUYLER, JR
Attesting Officer              Commissioner of Patents